Nov. 11, 1924.
H. MITCHELL
WELDED PIPE LINE JOINT AND METHOD OF MAKING THE SAME
Filed Jan. 26 1921
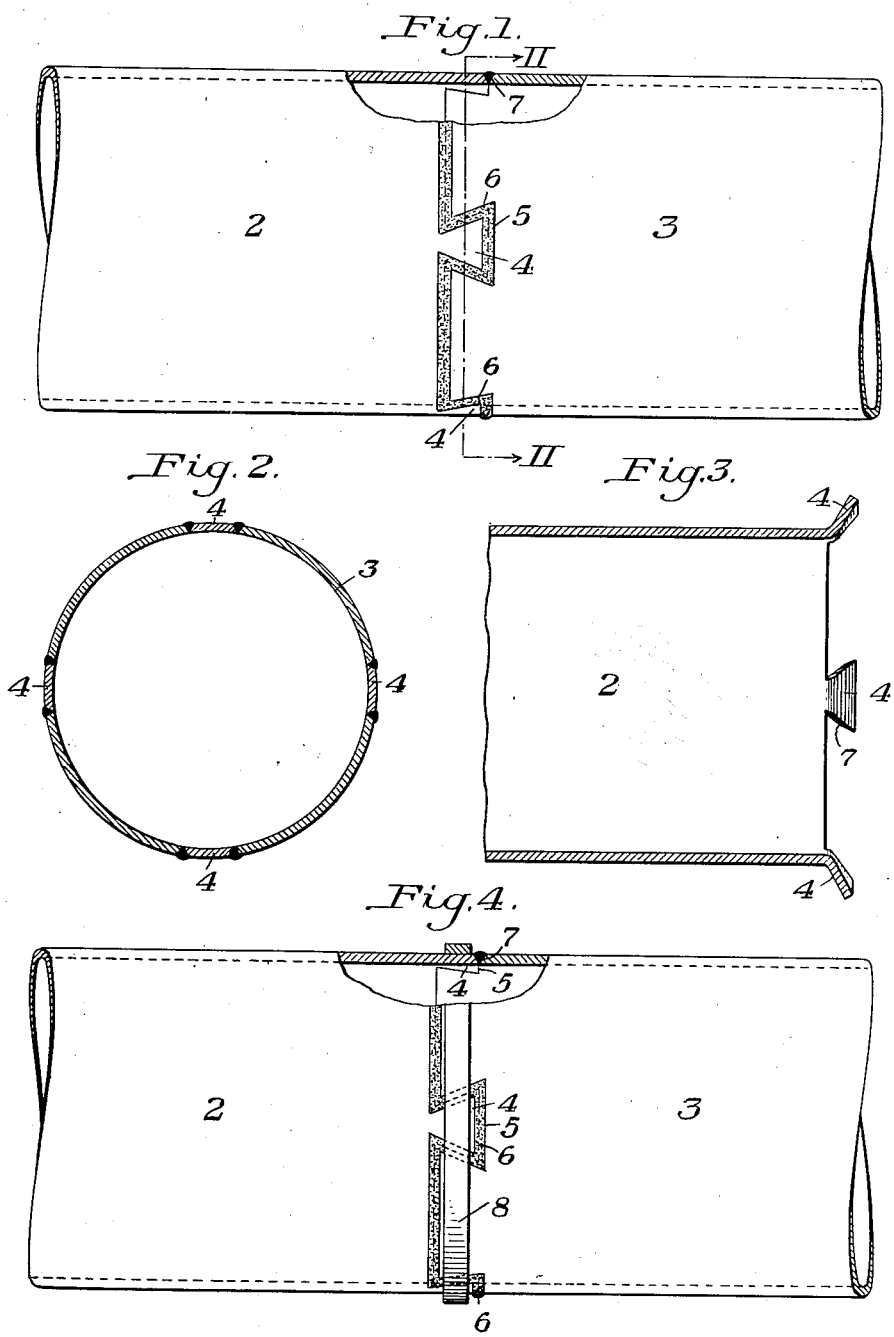

Patented Nov. 11, 1924.

1,515,355

UNITED STATES PATENT OFFICE.

HARBOUR MITCHELL, OF PITTSBURGH, PENNSYLVANIA, ASSIGNOR TO AMERICAN FOUNDRY & CONSTRUCTION COMPANY, OF PITTSBURGH, PENNSYLVANIA, A CORPORATION OF PENNSYLVANIA.

WELDED PIPE-LINE JOINT AND METHOD OF MAKING THE SAME.

Application filed January 26, 1921. Serial No. 440,208.

*To all whom it may concern:*

Be it known that I, HARBOUR MITCHELL, residing at Pittsburgh, in the county of Allegheny and State of Pennsylvania, have invented a new and useful Improvement in Welded Pipe-Line Joints and Methods of Making the Same, of which the following is a full, clear, and exact description, reference being had to the accompanying drawings, forming part of this specification, in which—

Figure 1 is a plan view partly broken away showing one form of joint embodying my invention;

Figure 2 is a section on the line II—II of Figure 1;

Figure 3 is a longitudinal sectional view of one of the pipe members and illustrating one step in the formation of the joint; and Figure 4 is a view similar to Figure 1, but showing a modification.

My invention has relation to improvements in welded joints for pipe lines, and to a novel method of making the same.

Heretofore it has been customary to make a welded joint between two pieces of pipe by abutting them end to end and making a butt welding connection between them. The personal factor of the welder enters very largely into the making of a weld of that character.

My invention is designed to provide a joint in which there is a positive mechanical connection between the two pipe sections which is sufficient to prevent their pulling apart or from bursting apart on account of internal pressure, the welding being largely secondary and being used only to prevent leakage, although giving an additional factor of safety against rupture.

In carrying out my invention, I provide the end portions of the pipe sections to be joined with interfitting tongues and grooves, such tongues and grooves having an interlocking connection when the two sections are assembled end to end. A weld is then effected not only between the end edges proper of the pipe sections, but also between the edges of the projections and the adjacent walls of the grooves.

The form and arrangement of the projections and grooves may be widely varied, as may also their number, the construction being sufficient in any case to give an ample factor of safety.

In the particular embodiment of my invention which I have shown in Figures 1, 2 and 3, the numerals 2 and 3 designate two pipe sections to be joined, one of these sections being formed with a plurality of dovetailed projections 4, extending beyond the end edge proper thereof, and the other section having a plurality of dovetailed grooves 5, each adapted to receive therein one of the projections 4. The width of the projections at their end portions is preferably greater than the width of the grooves at the narrowest portions of the grooves, so as to provide for an efficient mechanical interlock. There is, however, preferably a considerable space left between the jaws of the projections and the adjacent walls of the grooves, this space being formed by scarfing or beveling the edge portions of the tongues and groove walls, in order to permit a welding metal to be flowed therein, as indicated at 6. In the construction illustrated in these figures, there are four sets of interlocking grooves and projections.

In assembling the pipe sections, it is necessary to leave the projections 4 turned upwardly at an angle, as shown in Figure 3. When the sections are abutted, these projections are bent downwardly into their respective grooves. The welding metal is then flowed in to fill the space between the edges of the projections and the walls of the groove and also between the end edges proper of the pipe sections, the latter being preferably scarfed or beveled somewhat, as indicated at 7, to form a V-shaped surrounding groove to receive this welding metal.

In case of pipes which are subjected to unusual heavy internal pressures, the joint formed in the manner above described can be still further strengthened, if desired, by placing a reinforcing band around the joint, as shown in Figure 4, where one form of such band is illustrated at 8. This band can be spot or otherwise welded to the pipe and when used guards against any possibility of the joint rupturing by internal bursting pressure.

As above indicated, the particular forms of joints which I have herein shown and described are illustrative only, the invention being susceptible of many modifications within the scope of the appended claims.

I claim:

1. The method of forming a welded pipe joint, which consists in providing the adjacent end portions of two pipe sections to be welded with interfitting tongues or projections and grooves adapted to form a mechanical interlocking between the said sections for preventing longitudinal separation of the same due to internal pressure, engaging the tongues or projections of one section with the grooves of the other section by relatively moving the tongues or projections and grooves in a direction at an angle to the longitudinal axis of the sections, and then forming a welded connection between the abutted and interfitted ends of the sections, substantially as described.

2. The method of forming a welded pipe joint, which consists in providing the pipe sections of members to be welded with interfitting dovetailed tongues or projections and grooves, abutting the said sections and engaging the tongues or projections and grooves with each other by a relative movement between the tongues or projections and grooves at an angle to the longitudinal axis of the sections, and then forming a weld between the sections, said weld also extending between the edges of the tongues and the walls of the grooves, substantially as described.

3. The method of forming a welded pipe joint, which consists in providing the end portions of the pipe sections to be united with interfitting tongues or projections and grooves adapted to form a mechanical interlocking between the said sections for preventing longitudinal separation of the same due to internal pressure, the tongues extending at an oblique angle to the longitudinal axis of the sections, abutting the two sections, bending the tongues or projections into engagement with the grooves, and then welding the adjacent edges of the two sections, the weld extending between the edges of the tongues or projections and the walls of the grooves, substantially as described.

4. The method of forming a welded pipe joint, which consists in providing the end portions of the pipe sections to be united with interfitting tongues or projections and grooves adapted to form a mechanical interlocking between the said sections for preventing longitudinal separation of the same due to internal pressure, the tongues or projections extending outwardly at an oblique angle to the longitudinal axis of the sections, abutting the two sections, bending the tongues or projections inwardly into engagement with the grooves, and then welding the adjacent edges of the two sections by flowing a welding metal between the adjacent edge portions of the pipe sections and into the grooves around the edges of the tongues or projections, substantially as described.

5. The method of forming a welded pipe joint, which consists in providing the adjacent end portions of two pipe sections to be welded with interfitting tongues or projections and grooves adapted to form a mechanical interlocking between the said sections for preventing longitudinal separation of the same due to internal pressure, engaging the tongues or projections of one section with the grooves of the other section, forming a welded connection between the abutted and interfitted ends of the sections, and then securing a reinforcing band to the exterior of the joint, substantially as described.

6. A welded pipe joint, comprising two pipe members having adjacent ends formed with dovetailed interfitting portions united by a filling of welding metal between the end edges of the sections, said welding member also extending between and uniting the adjacent edges of the interfitting portions, substantially as described.

7. A welded pipe joint, comprising two pipe members having their abutting ends formed with a plurality of dovetailed tongues or projections and grooves, there being an initial space between the edges of the tongue and the walls of the groove, and a filling of welding metal in said space and forming a weld between said edges and walls, the abutting edge portions proper of said sections being beveled and the grooves so formed being filled with welding metal, substantially as described.

8. A pipe joint, comprising two pipe sections having interfitting tongues or projections and grooves, said sections and the tongues and grooves being welded at their adjacent edges, said welded tongues and grooves forming a mechanical interlocking between the said sections for preventing longitudinal separation of the same due to internal pressure, substantially as described.

9. A welded pipe joint, comprising two pipe sections having abutting end portions, said sections having interfitting dovetailed tongues and grooves, a welded connection between the ends and between the edges of the tongues and the adjacent walls of the grooves, and a reinforcing band extending around said joint exteriorly of the pipe sections, substantially as described.

In testimony whereof, I have hereunto set my hand.

HARBOUR MITCHELL.